United States Patent [19]

Sayles

[11] 3,715,246
[45] Feb. 6, 1973

[54] PROPELLANTS DERIVED FROM CROSSLINKING OF POLYBUTADIENE ELASTOMERS

[75] Inventor: David C. Sayles, Huntsville, Ala.

[73] Assignee: The United States of America as represented by the Secretary of the Army

[22] Filed: May 12, 1970

[21] Appl. No.: 48,618

[52] U.S. Cl. .....................149/19, 149/20, 149/21, 149/42, 149/44, 149/76, 149/113
[51] Int. Cl. .............................................C06b 11/00
[58] Field of Search..........149/19, 20, 21, 42, 44, 76, 149/113

[56] References Cited

UNITED STATES PATENTS

| | | | |
|---|---|---|---|
| 3,399,088 | 8/1968 | Christian et al. | 149/76 X |
| 3,551,225 | 12/1970 | Sayles | 149/76 X |

Primary Examiner—Stephen J. Lechert, Jr.
Attorney—Harry M. Saragovitz, Edward J. Kelly, Herbert Berl and James T. Deaton

[57] ABSTRACT

Composite propellant compositions are disclosed which contain binders formed from polybutadiene prepolymers cross-linked by siloxane compounds. The crosslinking by siloxanes to produce propellant binders eliminates the need for end-capping polybutadiene to introduce functional groups through which crosslinking can be effected. The pertinent siloxane compounds contain two silicon hydride bonds of the types present in: 1,1,3,3-tetramethyldisiloxane, $(CH_3)_2H \cdot SiO \cdot SiH(CH_3)_2$; 1,1,1-3,5,7,7,7-octamethyltetrasiloxane, $(CH_3)_3 \cdot Si \cdot O \cdot Si(H \cdot CH_3) \cdot O \cdot Si(H \cdot CH_3) \cdot O \cdot Si(CH_3)_3$. The prepolymers are crosslinked in a composite propellant composition to produce the propellant binder for the composition. When the crosslinking technique is used in a propellant production process which additionally employs hydroxyl-terminated polybutadiene in combination with a polyisocyanate, a propellant binder with improved mechanical properties and improved stability is produced.

8 Claims, No Drawings

PROPELLANTS DERIVED FROM CROSSLINKING OF POLYBUTADIENE ELASTOMERS

CROSS-REFERENCE TO RELATED APPLICATION

This application is related to application Ser. No. 851,137, filed July 30, 1969, in the use of an interfacial bonding agent disclosed therein.

BACKGROUND OF THE INVENTION

Prior art composite propellant compositions have employed binders of the polybutadiene type, both hydroxyl-or carboxyl-terminated. When polybutadiene is terminated by a hydroxyl-or carboxyl-group, a functional group is thereby introduced through which crosslinking is effected. The process for terminating polybutadiene is generally referred to as end-capping. One method for end-capping or the production of hydroxyl- or carboxyl-terminated polybutadiene is by anionic polymerization of butadiene using a metal alkyl. The terminal functional groups are attached by reaction with an epoxide or carbon dioxide respectively to produce polybutadiene prepolymers. The described polybutadiene prepolymers are crosslinked by means of polyisocyanates for the hydroxyl-terminated prepolymers or by means of epoxides or aziridinyl compounds for the carboxyl-terminated prepolymers. The polyurethane, the phosphamide, and the polyester groups of these polymers are susceptible to hydrolytic degradation or scission by various types of reactions. Degradation and/or scission of groups within propellant systems are detrimental to the propellant's desirable physical and chemical properties.

An object of this invention is to provide a composite propellant which utilizes a binder formed from polybutadiene prepolymer crosslinked with a siloxane.

Another object of this invention is to provide a composite propellant which utilizes a binder formed from hydroxyl-terminated polybutadiene crosslinked with a siloxane and a polyisocyanate.

SUMMARY OF THE INVENTION

Polybutadiene prepolymer is crosslinked with a siloxane to form a binder for the propellant composition wherein used. The point of reaction is with the unsaturated linkages which occur in the polybutadiene prepolymer — one per four carbon atoms. The reaction between a terminal alkenic linkage of two moieties of two polybutadiene prepolymers and the 1,1,3,3-tetramethyldisiloxane is depicted by the following structural equations:

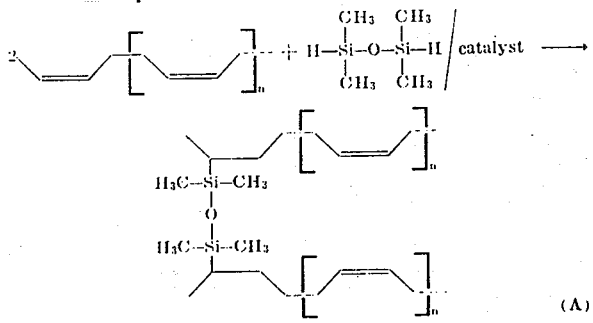

Product (A) represents a portion of the binder material wherein n equals multiple units dependent upon the molecular weight of the prepolymer employed in the reaction. The catalyst for the reaction may be selected from chloroplatinic acid, iron linoleate, and the like.

The composite propellant compositions of this invention are comprised of the ingredients (in weight percent of the propellant composition) as follows: inorganic oxidizer ammonium perchlorate in amounts from about 60–72 weight percent, aluminum metal fuel in amounts from about 5 to about 20 weight percent, polybutadiene prepolymer from about 8 to about 16 weight percent, a siloxane selected from 1,1,3,3-tetramethyldisiloxane and 1,1,1,3,5,7,7,7-octamethyltetrasiloxane from about 0.3 to about 2.0 weight percent, n-butylferrocene (burning rate catalyst) from about 0.5 to about 3.0 weight percent, and iron linoleate from about 0.1 to about 0.3 weight percent. An interfacial bonding agent in an amount from about 0.05 to about 1.0 weight percent of the total propellant ingredients, as an additive, may be used in the composition.

Powdered metals, as fuels, useful in the propellant compositions of this invention include in addition to aluminum, magnesium, titanium, zirconium, and boron. Alloys and mixtures of the aforesaid metals may also be employed. Aluminum metal powder is the preferred metal fuel.

The interfacial bonding agents employed in the propellant formulations of this invention may be any of the reaction products of di- or tri-functional aziridinyl phosphine oxides or their derivatives with polyfunctional carboxylic acids as specifically set forth in a commonly assigned Patent Application Ser. No. 851,137, filed July 30, 1969. The nominal structure of the reaction product may be represented by the following general formula:

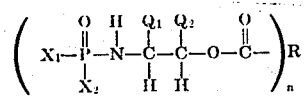

Where $X_1$ represents an aziridine group of the structure:

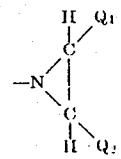

and $Q_1$ and $Q_2$ are either hydrogen or alkyl groups of one to four carbon atoms ($Q_1$ and $Q_2$ may be the same or different), $X_2$ may be the same as $X_1$ or may be an organic radical such as phenyl, benzyl, ethyl, etc., R is an alkyl that contains at least one active hydrogen atom or an organic entity of molecules that contain one or more hydroxyl groups, and $n$ is 2, 3, or 4.

The reaction product described above, is produced by dissolving the reactants in a suitable inert organic solvent such as methanol, ethanol, methylene chloride, tetrahydrofuran, diethyl ether, or mixtures of these. It has been found to be preferable that methanol or ethanol comprise at least a part of the solvent. Reaction temperature is not critical, and may range from 70° to 200°F for such time as is needed for essentially all carboxyl groups to be reacted. The solvent is then removed by any suitable means, such as evaporation under vacuum at elevated temperatures. The residue is the reaction product, an interfacial bonding agent, which is usually straw-colored and quite viscous.

DESCRIPTION OF THE PREFERRED EMBODIMENTS

The disiloxanes preferred for use in this invention have two silicon hydride bonds as described earlier herein. The 1,1,3,3-tetramethyldisiloxane has the following other characteristics: b.p. 72°C at 760 mm of $H_g$, $N_D^{25}$ 1.3674, $d_4^{25}$ 0.7512; and 1,1,1,3,5,7,7,7-octamethyltetrasiloxane has the following other characteristics: b.p. 84°C at 31 mm of $H_g$, $N_D^{25}$ 1.3830, $d_4^{25}$ 0.852.

The polybutadiene prepolymer used in this invention may be one prepared of a particular average molecular weight by controlling the reaction condition. Any one of several polybutadiene prepolymers, commercially available, are satisfactory for use in this invention. Several polybutadiene prepolymers are presently commercially available since these are used to plasticize the functionally terminated polybutadienes.

The inorganic oxidizer, ammonium perchlorate of 67/33 blend of 200μ/20μ particle size is preferred; however, different burning rates can be obtained and different physical properties can be obtained by other combinations of different particle sizes.

Aluminum powder of 6μ particle size is very satisfactory for use in this invention.

The manufacture of a composite propellant wherein the polybutadiene prepolymer is crosslinked with a polysiloxane can be effected using the usual equipment which is available for the preparation of composite propellants.

A representative composition of a propellant of this invention is set forth under Example I below.

EXAMPLE I

| Ingredient | Weight Percent |
|---|---|
| Ammonium perchlorate (67/33 – 200μ/20μ | 71.0 |
| Aluminum (6μ) | 16.0 |
| Polybutadiene prepolymer | 10.0 |
| 1,1,3,3-tetramethyldisiloxane | 0.4 |
| n-butylferrocene | 2.5 |
| Iron linoleate | 0.1 |
| TOTAL | 100.0 |

An additive of an interfacial bonding agent in the amount of 0.1 weight percent, (based on the weight of other propellant ingredients), is added to the composition to improve mechanical properties of the cured propellant.

The interfacial bonding agent, such as the reaction products of di- or tri-functional aziridinyl phosphine oxides or their derivatives with polyfunctional carboxylic acids and described earlier herein, is believed to function by coating the ammonium perchlorate with a thin film of the described product. The ammonium perchlorate then catalyzes the homopolymerization of the remaining aziridine rings in the reaction product, thus linking the molecules together to yield a highly cross-linked network product.

Example II illustrates how the crosslinking technique of the disiloxane can be used with presently used binder materials to render improvement of properties thereof. Hydroxyl-terminated polybutadiene is used in combination with a typical polyisocyanate as the crosslinking agent, and the polybutadiene prepolymer is used with the disiloxane as a crosslinking agent. A highly crosslinked polymer results from the combination. In addition to providing crosslinking for terminal alkenic linkage of the polybutadiene of the prepolymer, the disiloxane provides additional crosslinking for the binder system formed from hydroxyl-terminated polybutadiene crosslinked with a polyisocyanate. Example II illustrates how a polybutadiene prepolymer and a disiloxane can be utilized with a conventional end-capped polybutadiene and crosslinking agent to provide a high binder content propellant with improved mechanical properties and improved stabilities against hydrolytic degradation and scission by various types of reactions.

The range of percent by weight of the propellant set forth earlier herein applies to the propellant ingredients of Example II. The additional ingredients set forth in Example II (e.g., hydroxyl-terminated polybutadiene and toluene diisocyanate) are used in amounts from about 5 to about 10 percent by weight of the propellant composition and from about 0.5 to about 2 percent by weight of the propellant composition, respectively. Also, the polybutadiene prepolymer, when used in combination with hydroxyl-terminated polybutadiene, is used in amounts from about 5 to about 10 percent by weight of the propellant composition.

EXAMPLE II

| INGREDIENT | WEIGHT PERCENT |
|---|---|
| Ammonium perchlorate (67/33-200μ/20μ) | 66.0 |
| Aluminum (6μ) | 16.0 |
| Hydroxyl-terminated polybutadiene | 7.0 |
| Toluene diisocyanate | 1.0 |
| Polybutadiene prepolymer | 7.0 |
| 1,1,3,3-tetramethyldisiloxane | 0.4 |
| n-butylferrocene | 2.5 |
| Iron linoleate | 0.1 |
| TOTAL | 100.0 |

The interfacial bonding agent as used under Example I may be optionally used with Example II formulation in an amount from about 0.05 weight percent to about 1.0 weight percent of the other propellant ingredients. The interfacial bonding agent is used as previously described to improve mechanical properties and stability of the finished propellant.

I claim:

1. A composite propellant composition comprising an inorganic oxidizer ammonium perchlorate; aluminum metal fuel; a burning rate catalyst n-butylferrocene; and a binder comprised of a polybutadiene prepolymer crosslinked under catalytic reaction with a selected siloxane compound containing two silicon hydride bonds, said catalytic reaction being conducted in the presence of a catalyst selected from the group consisting of chloroplatinic acid and iron linoleate and said siloxane compound being selected from the group consisting of 1,1,3,3-tetramethyldisiloxane and 1,1,1,3,5,7,7,7-octamethyltetrasiloxane.

2. The propellant composition of claim 1 and wherein said inorganic oxidizer ammonium perchlorate is present in amounts from about 60 to about 72 weight percent of said composition; said aluminum metal fuel is powdered and said aluminum metal fuel is present in amounts from about 5 to about 20 weight percent of said composition; said burning rate catalyst of n-butylferrocene is present in amounts from 0.5 to about 3.0 weight percent of said composition; said catalyst for catalytic reaction is iron linoleate which is present in amounts from about 0.1 to about 0.3 weight percent of said composition; said selected siloxane compound is present in an amount from about 0.3 to about 2.0 weight percent of said composition; and wherein said composition additionally contains an interfacial bonding agent, as an additive, in the amount of from about 0.05 to about 1.0 weight percent of the total propellant ingredients.

3. The propellant composition of claim 2 and wherein said inorganic oxidizer ammonium perchlorate is a blend of 200 micron particle size, 67 parts, and 20 micron particle size, 33 parts, said blended ammonium perchlorate being present in an amount of about 71 weight percent of said composition; said aluminum metal fuel is present in an amount of about 16 weight percent of said composition; said burning rate catalyst of n-butylferrocene is present in an amount of about 2.5 weight percent of said composition; said iron linoleate is present in an amount of about 0.1 weight percent of said composition; said binder is present in an amount of about 10.4 weight percent of said composition said binder being comprised of said polybutadiene prepolymer in an amount of about 10 weight percent of said composition and crosslinked with the selected siloxane compound which is 1,1,3,3-tetramethyldisiloxane, and said selected siloxane compound being present in an amount of about 0.4 weight percent of said composition; and wherein said interfacial bonding agent is present in an amount of about 0.1 weight percent of the total propellant ingredients.

4. The propellant composition of claim 2 and wherein said inorganic oxidizer ammonium perchlorate is a blend of 200 micron particle size, 67 parts, and 20 micron particle size, 33 parts; said aluminum metal fuel is present in an amount of about 16 weight percent of said composition; said burning rate catalyst of n-butylferrocene is present in an amount of about 2.5 weight percent of said composition; said iron linoleate is present in an amount of about 0.1 weight percent of said composition; said binder is present in an amount of about 10.4 weight percent of said composition, said binder is comprised of said polybutadiene prepolymer in an amount of about 10 weight percent of said composition and crosslinked with the selected siloxane compound which is 1,1,1,3,5,7,7,7-octamethyltetrasiloxane, said selected siloxane compound being present in an amount of about 0.4 weight percent of said composition; and wherein said interfacial bonding agent is present in an amount of about 0.1 weight percent of the total propellant ingredients.

5. The composite propellant composition of claim 1 wherein said composition contains an additional binder of hydroxyl-terminated polybutadiene crosslinked with toluene diisocyanate.

6. The propellant composition of claim 5 and wherein said inorganic oxidizer ammonium perchlorate is present in amounts from about 60 to about 72 weight percent of said composition; said aluminum metal fuel is powdered and said aluminum powder is present in amounts from about 5 to about 20 weight percent of said composition; said burning rate catalyst of n-butylferrocene is present in amounts from about 0.5 to about 3.0 weight percent of said composition; said iron linoleate is present in amounts from about 0.1 to about 0.3 weight percent of said composition; said hydroxyl-terminated polybutadiene is present in amounts from about 5 to about 10 percent by weight of said composition; said toluene diisocyanate is present in amounts from about 0.5 to about 2.0 percent by weight of said composition; said polybutadiene prepolymer is present in amounts from about 5 to about 10 percent by weight of said composition; said selected siloxane compound is selected from the group consisting of 1,1,3,3-tetramethyldisiloxane and 1,1,1,3,5,7,7,7-octamethyltetrasiloxane and is present in amounts from about 0.3 to about 2.0 percent by weight of said composition; and said composition additionally containing an interfacial bonding agent, as an additive, in the amount of from about 0.05 to about 1.0 percent by weight of the total propellant ingredients.

7. The propellant composition of claim 6 and wherein said inorganic oxidizer ammonium perchlorate is a blend of 200 micron size, 67 parts, and 20 micron particle size, 33 parts, said blended ammonium perchlorate being present in an amount of about 66 percent by weight of said composition; said aluminum metal fuel is present in an amount of about 16 percent by weight of said composition; said burning rate catalyst of n-butylferrocene is present in an amount of about 2.5 percent by weight of said composition; said iron linoleate is present in an amount of about 0.1 percent by weight of said composition; said polybutadiene prepolymer is present in an amount of about 7 percent by weight of said composition; said selected siloxane compound is 1,1,3,3-tetramethyldisiloxane which is present in an amount of about 0.4 percent by weight of said composition; said hydroxyl-terminated polybutadiene is present in an amount of about 7 percent by weight of said composition; said toluene diisocyanate is present in an amount of about 1.0 percent by weight of said composition; and said interfacial bonding agent is present in an amount of about 0.1 percent by weight of the total propellant ingredients.

8. The propellant composition of claim 7 and wherein said inorganic oxidizer ammonium perchlorate is a blend of 200 micron size, 67 parts, and 20 micron particle size, 33 parts, said blended ammonium perchlorate being present in an amount of about 66 percent by weight of said composition; said aluminum metal fuel is present in an amount of about 16 percent by weight of said composition; said burning rate catalyst of n-butylferrocene is present in an amount of about 2.5 percent by weight of said composition; said iron linoleate is present in an amount of about 0.1 percent by weight of said composition; said polybutadiene prepolymer is present in an amount of about 7 percent by weight of said composition; said selected siloxane compound is 1,1,1,3,5,7,7,7-octamethyltetrasiloxane which is present in an amount of about 0.4 percent by weight of said composition; said hydroxyl-terminated polybutadiene is present in an amount of about 7 percent by weight of said composition; said toluene diisocyanate is present in an amount of about 1.0 percent by weight of said composition; and said interfacial bonding agent is present in an amount of about 0.1 percent by weight of the total propellant ingredients.

* * * * *